9755X

J. & J. Sutton,

Dressing Stone.

Patented June 20, 1836.

AM. PHOTO-LITHO. CO. N.Y. (OSBORNE'S PROCESS)

9755 X 6-20-1836 1, [illegible]

Patent of James & John Sutton

The Schedule referred to in these Letters Patent and
making part of the same, containing a description in the
words of the said James Sutton and John Sutton themselves
of their "Improvement in the Machine for Cutting and facing
Stone".

Figure 2:
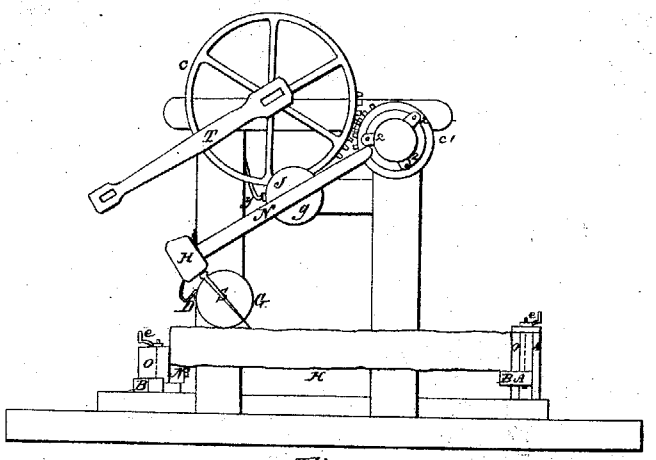
Figure 1:
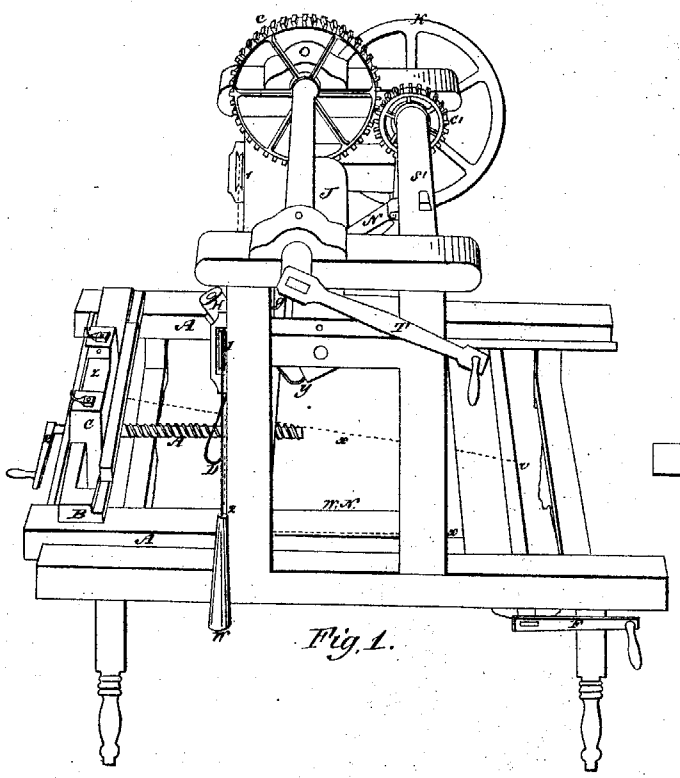

To all to whom these presents shall come: Be it known that
we James Sutton of the town of Redding, in the County of Steuben
and John Sutton of the town of Milo in the county of Yates, in the
State of New York have invented a new and useful improvement
in Machine for Cutting and facing Stone, and that the following
is a full and exact description of the construction and operation of the said im-
provement or machine as invent by us, to wit_ J.J. the crank
and shaft by which the cog wheel C pinion C I balance wheel
K and shaft S [illegible] to make a rotary motion.
The cogs C, and C. 2, acting upon the hammer helves. to cause the
hammers H. to raise off from the chisels S. Figure 2. The force
of the hammers on their return is strengthened by the action of the springs
G, G. The shaft I is the center of motion, of the helves. F, The shaft
G, through which the chisels S passes, is ~~drove back~~ by the pressure
of the stone against the points of the chisels, as represented by
Figure 2. K. the marble or stone. D.D. are springs acting against
the shaft G, which causes the chisels S to act upon the stone with
much greater force than it would with the hammers alone.
A. A. The carriage. B and B. A. The head blocks. M and B. A.
are blocks on which the stone is placed. The blocks M and B. A
are raised and depressed by means of rods passing through the
uprights C, O, and C, A, [illegible] are nuts. This will be more readily
understood by Figure 2. C and C. A, are the uprights. M and B. A,
are blocks. K, the stone. C, C, the nuts; and the dotted lines represents
the rods. E a bar tenoned in the posts C, C; L, A, [illegible] a crank
and screw by which the head blocks B is moved along on 4. 9755X 6-20-1836 2.

the carriage A. A. to suit the length of the stone. W the weights
by which the carriage is drawn forward, the dotted line represents
a rope attached to the rear End of the carriage passing under the
pulley 1, and over the pulley 2. J. P. H. the crank, shaft and
rope by which the carriage is drawn back again. The said
improvement or Machine to be set in motion and be propelled
by either human, animal, water, or steam power.
Picks may be arranged in front of the Chisels to prepare
rough Stone for the action of the chisels.

What we claim as new, and our own invention or discovery
in the above described Machine is the combination of those parts
and powers which compose the said Machine for the purpose of
cutting & facing Stone

Witnesses
Saml L. Crawford
Charles W. Root

James Sutton
John Sutton

Exd W.G. Patented June 20th 1836. (602 ..

(Recd. & Recorded anew September 9. 1839.)
(Drawing)